Feb. 6, 1962  R. SOMMER  3,019,716
PHOTOGRAPHIC CAMERA PROVIDED WITH
SHUTTER AND DIAPHRAGM
Filed May 21, 1958
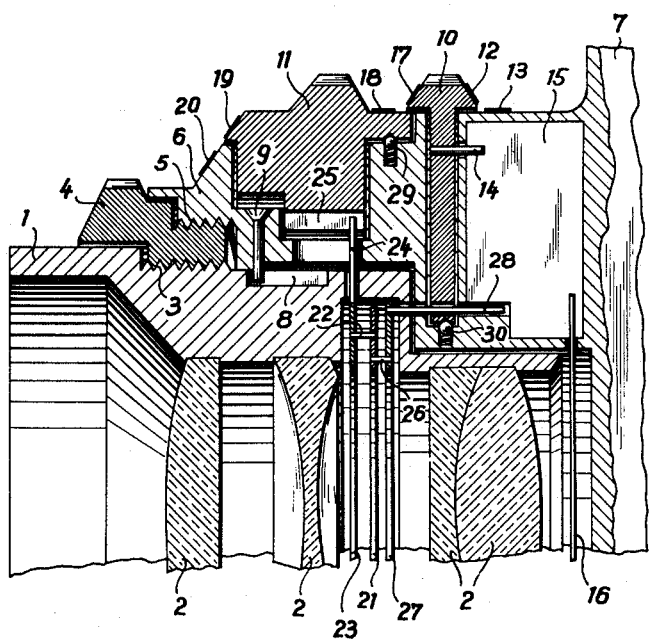
INVENTOR
RICHARD SOMMER
BY   Mocket Blum
           ATTORNEYS

# United States Patent Office 3,019,716
Patented Feb. 6, 1962

3,019,716
PHOTOGRAPHIC CAMERA PROVIDED WITH
SHUTTER AND DIAPHRAGM
Richard Sommer, Braunschweig, Germany, assignor to
Voigtlander A.G., Braunschweig, Germany, a corporation of Germany
Filed May 21, 1958, Ser. No. 736,838
3 Claims. (Cl. 95—64)

This invention relates to shutter and diaphragm controls for photographic cameras, and it has particular relation to cameras having diaphragms which are adjustable by means of two diaphragm adjusters, one of which is coupled with a shutter time adjusting member, in the sense of an exposure value adjustment, while the other of said adjusters is freely displaceable by hand.

In such constructions, the adjustment of exposure value and the subsequent selection of a corresponding shutter time-diaphragm value-combination, can be effected in a simple manner. One of the diaphragm adjusters is adjustable with respect to a scale of exposure values, so that, upon adjustment of an exposure value that diaphragm is set to the value which—together with the adjusted shutter time value—yields the combination corresponding to said exposure value. If then, the shutter time adjusting member is adjusted subsequently to a value corresponding to the picture taking conditions, due to its coupling with the other diaphragm adjuster, the diaphragm is adjusted in conformity with the exposure value. Thus, the diaphragm value changes upon displacement of the adjusting means connected with the free diaphragm adjuster, as well as upon displacement of the shutter time adjusting means.

It is a main object of the present invention to provide a simple and clear arrangement of scales, which provides, in a single observation, the adjusted shutter time and the diaphragm value adjusted, in each case, and in a well-defined and unmistakable manner.

According to the present invention, it is contemplated that the position of the shutter time adjusting member be readable relative to a stationary as well as a displaceable indicating point, whereby the stationary indicating point shows the shutter time value adjusted in each case and the displaceable indicating point shows the diaphragm value adjusted in each case.

The shutter time adjusting member is preferably a ring which carries two marks. One of said marks cooperates with a stationary scale of shutter time values, and the other mark cooperates with a diaphragm scale arranged on an adjusting ring coupled with the free diaphragm adjuster. It will be appreciated that one or both of the scales can be arranged also on the shutter time adjusting ring and the adjusting marks arranged on the stationary and the displaceable part respectively. It is likewise possible in the above first mentioned scale arrangement, to arrange the two adjusting marks along a continuous scale line, one end of which would then provide one of the scales and the other end the other of the scales.

In order to fix the diaphragm position, it is of advantage to apply to each of the two diaphragm adjusters a stop device, one of said devices acting on the shutter time adjusting ring coupled with one of the diaphragm adjusters and the other acting on the adjusting handle of the free diaphragm adjuster, or on a member connected therewith. The stop device acting on the free diaphragm adjuster can be divided into fractions of its adjusting scale so that intermediate diaphragm values can be likewise fixedly adjusted.

The adjusting means for the free diaphragm adjuster, which is preferably an adjusting ring, can be at the same time the carrier for a part of a scale arrangement which is readable relative to a stationary point. This scale arrangement can be a scale of exposure values, so that the free diaphragm adjuster is adjustable to a definite exposure value, whereby the diaphragm is adjusted to that value which—together with the shutter time value adjusted in the respective case—yields a combination correctly corresponding to the exposure value. However, the scale also can be calibrated according to fixed adjusting values, e.g. those of film sensitivity or filters, so that a fixed preliminary adjustment of the daiphragm is possible.

The appended drawing illustrates by way of example a specific embodiment of and a best mode of carrying out the invention, to which the invention is not limited.

The drawing illustrates, in arial section, an objective mount including the adjusting device of the present invention, said mount forming a structural unit with the casing of a central shutter.

Referring now to the drawing in detail, the lenses 2 forming the picture taking objective are held in the mount part 1. The latter is connected by means of an adjusting thread 3 with an adjusting ring 4, which, in turn, is displaceably arranged in a thread 5 of objective mount body 6. This body 6 is fixedly or releasably connected with camera body 7. In mount part 1, a recess 8, which extends parallel to the optical axis, is provided, and said recess 8 is engaged by a pin 9, or the like, which is fixedly seated in objective mount body 6. In this manner, mount part 1 is maintained against rotation relative to mount body 6, so that mount part 1 is axially displaced in objective mount body 6, upon turning adjusting ring 4.

Objective mount body 6 forms a structural unit with the casing of a central shutter. Arranged in body 6 are a shutter time adjusting ring 10 and a diaphragm adjusting ring 11. Ring 10 carries an adjusting mark 12, which cooperates with a shutter time scale 13 arranged on body 6. Shutter time adjusting ring 10 is connected, by means of a coupling member 14, with the drive mechanism 15 of the shutter. Only one of the shutter sectors is shown at 16 in the drawing.

Shutter time adjusting ring 10 also carries a mark 17, which cooperates with a diaphragm scale 18 arranged on diaphragm adjusting ring 11. The two marks 12 and 17 can be joined to form a single scale line or indicator, one end of which points then to scale 13 and the other end to scale 18.

Diaphragm adjusting ring 11 carries a further scale 19, of exposure values, which is adjustable relative to a mark 20 provided on objective mount body 6.

Between lenses 2 an iris diaphragm is arranged. For the sake of clearness, only a single diaphragm lamella 21 is shown in the drawing. A control pin 22 seated therein engages lamella control ring 23, which is rotatably arranged in mount part 1 and engages one of its control cams. Ring 23 has a flap 24, which passes through openings in mount part 1 and in objective mount body 6 and has a free end engaged in a groove 25, which is provided in diaphragm adjusting ring 11 and extends parallel to the optical axis. In this manner, lamella control ring 23 and diaphragm adjusting ring 11 are non-rotatably coupled with each other.

This coupling is maintained when, during adjustment to distance of the objective, mount part 1, and together with it the iris diaphragm, is displaced relative to objective mount body 6 and diaphragm adjusting ring 11 arranged therein, because flap 24 of lamella control ring 23 slides then along groove 25 of diaphragm adjusting ring 11.

Bearing pin 26 of diaphragm lamella 21 is seated in lamella bearing ring 27. This ring 27 is likewise rotatably arranged in mount part 1 so that lamellae 21 of the iris diaphragm can be displaced by turning control ring 23, as well as by turning ring 27. Such iris diaphragms provided with two diaphragm adjusters have been known by themselves. It has also been known, in such iris diaphragms to couple one of the diaphragm adjusters with the shutter time adjusting member.

In the adjusting device embodying the present invention this coupling is likewise present due to the engagement of a bore provided in shutter time adjusting ring 10 by coupling pin 28, which is fixedly seated in lamella bearing ring 27. Pin 28 is of such length that said coupling still exists even when during adjustment to distance of the picture taking objective, mount part 1, and together with it the iris diaphragm, is displaced relative to objective mount body 6 and shutter time adjusting ring 10 arranged therein, because coupling pin 28 is capable of movement in axial direction in the bore of shutter time adjusting ring 10.

The adjusting paths of the iris diaphragm are proportioned or fitted to the adjusting paths of the shutter time adjusting ring in such a manner that the coupling provided for between these devices correctly corresponds to the exposure value. Thus, when the shutter time is adjusted from a certain value to another value of double length, the iris diaphragm will be closed by one diaphragm value.

The value, to which the iris diaphragm is adjusted in an individual case, is indicated by scale 18 and mark 17. If this diaphragm opening is changed by turning shutter time adjusting ring 10, the adjusted value will be indicated by movement of mark 17 provided on ring 10, relative to diaphragm scale 18, which remains stationary. If, on the other hand, the iris diaphragm is adjusted by turning diaphragm adjusting ring 11, the adjusted value will be indicated by movement of diaphragm scale 18 relative to mark 17 which now remains stationary.

At the same time, scale arrangement 19, 20 indicates the exposure value, resulting from combination of the shutter time value and diaphragm value, in the respective case. Upon a change of shutter time and diaphragm opening, brought about by displacement of the shutter time adjusting ring 10, there is no displacement of scale 19, 20, because there is then no change of the exposure value. Displacement of scale 19, 20 will take place only if diaphragm adjusting ring 11 is turned, because in this case only the diaphragm opening changes, while the shutter time remains unchanged. However, the scale arrangement 19, 20 can be calibrated also according to fixed adjustment factors, e.g. those of filters, so that a fixed preliminary adjustment can be given to the diaphragm.

The shutter time adjusting ring 10, as well as the diaphragm adjusting ring 11 are acted upon by stop devices 30 and 29, respectively, which releasably arrest these members in the positions corresponding to the value to be adjusted. The stop device acting on diaphragm adjusting ring 11 can be so finely subdivided that positions located between graduation points of scale arrangement 19, 20 can be also arrested.

It will be understood from the above that this invention is not limited to the specific constructions, arrangements, designs and other details specifically described above and illustrated in the drawing and can be carried out with various modifications without departing from the scope of the invention as defined in the appended claims.

In taking a photographic picture with the above described camera, first adjustment to distance has to be carried out by turning ring 4. Thereby the total objective including the built-in-diaphragm, is displaced in axial direction without change of the adjusted diaphragm opening. Subsequently, either first the shutter and then the diaphragm or, in the reverse order, first the diaphragm and then the shutter time are adjusted by the adjusting rings 10 and 11. If the adjustment is supposed to be carried out according to a measured light value, then—after adjustment of the distance—first the diaphragm adjusting ring 11 with its scale 19 of the exposure values has to be adjusted to the mark 20 which is stationary relative to the camera casing. Subsequently—depending on whether definition in depth or sharpness of movement is considered more important—adjusting ring 10 should be adjusted with respect either to diaphragm scale 18 or to shutter time adjusting scale 13. As all necessary adjustments have thus been made, the shutter can then be released.

What is claimed is:

1. In a camera objective assembly including an objective mount, a shutter; an adjustable iris diaphragm including a pair of coaxial adjusting rings rotatable independently of each other, each of the diaphragm lamellae being pivotally connected to both rings for adjustment by rotation of either ring relative to the other ring; a manually rotatable exposure time setting ring operatively associated with said shutter and coupled to one of said adjusting rings to rotate the latter during setting of exposure time, said exposure time setting ring having a pair of oppositely facing frusto-conical side surfaces coaxial therewith; a manually rotatable diaphragm setting ring coupled to the other adjusting ring to rotate the latter during setting of the diaphragm by said diaphragm setting ring, said diaphragm setting ring having, at one side facing said exposure time setting ring, a cylindrical surface; a fixed portion of said assembly, coaxial with the objective axis, supporting a stationary scale of exposure time values immediately adjacent one frusto-conical side surface of said exposure time setting ring and extending in the direction of movement of the latter; a diaphragm scale extending along said cylindrical surface of said diaphragm setting ring, and immediately adjacent and extending along the other side of said exposure time setting ring; a first indicator fixed on said one frusto-conical side surface of said exposure time setting ring and cooperable with said stationary scale; and a second indicator fixed on the other frusto-conical side surface of said exposure time setting ring and cooperable with said diaphragm scale; whereby upon movement of said diaphragm setting ring, the diaphragm aperture is adjusted in accordance with movement of said diaphragm scale relative to said second indicator and, upon movement of said exposure time setting ring, the diaphragm is adjusted in accordance with movement of said first indicator relative to said stationary scale and said second indicator relative to said diaphragm scale so that exposure time is set simultaneously with adjustment of the diaphragm aperture in accordance with the exposure time adjustment and with reading of the diaphragm adjustment by reference to said second indicator cooperable with said diaphragm scale; said diaphragm setting ring having, at the opposite side, a frusto-conical outer surface geometrically coextensive with a frusto-conical outer surface of the objective mount; one of said frusto-conical outer surfaces carrying a filter factor scale and the other frusto-conical outer surface carrying a mark cooperable with said filter factor scale; said other frusto-conical side surface of said exposure time setting ring partially overlapping the adjacent cylindrical surface of said diaphragm setting ring.

2. In a camera objective assembly as claimed in claim 1: said first and second indicators being aligned with each other transversely of said scales.

3. In a camera objective assembly as claimed in claim 1: individual releasable latch means cooperable with said two setting rings to releasably retain the latter in adjusted position.

References Cited in the file of this patent

UNITED STATES PATENTS

| | | |
|---|---|---|
| 2,684,611 | Hinden | July 27, 1954 |
| 2,926,585 | Gebele | Mar. 1, 1960 |

FOREIGN PATENTS

| | | |
|---|---|---|
| 1,125,254 | France | July 9, 1956 |